United States Patent

Brewington et al.

[11] Patent Number: 6,102,593
[45] Date of Patent: Aug. 15, 2000

[54] HIGH SPEED PRINT QUALITY FONT MODIFICATION

[75] Inventors: James Gabriel Brewington, Raleigh; David William Stanhope, Cary, both of N.C.

[73] Assignee: International Business Machines Corporation, Armonk, N.Y.

[21] Appl. No.: 09/293,004

[22] Filed: Apr. 16, 1999

[51] Int. Cl.[7] .................................................... B41J 2/315
[52] U.S. Cl. ............................... 400/120.01; 400/120.09
[58] Field of Search ........................... 400/120.09, 120.01

[56] References Cited

U.S. PATENT DOCUMENTS

| | | |
|---|---|---|
| 4,566,813 | 1/1986 | Kobayashi et al. . |
| 4,870,428 | 9/1989 | Kuwabara et al. . |
| 5,184,150 | 2/1993 | Sugimoto . |
| 5,676,473 | 10/1997 | Wright, IV et al. ..................... 400/103 |
| 5,681,120 | 10/1997 | Ackley ................................... 400/103 |
| 5,764,246 | 6/1998 | Wataya et al. . |
| 5,767,889 | 6/1998 | Ackley . |
| 5,841,954 | 11/1998 | Ackley .................................... 395/108 |
| 5,897,255 | 4/1999 | Ackley .............................. 400/120.09 |

*Primary Examiner*—John S. Hilten
*Assistant Examiner*—Charles H. Nolan, Jr.
*Attorney, Agent, or Firm*—John D. Flynn; Winstead, Sechrest & Minick

[57] ABSTRACT

A printer using font modification logic for improving the print quality of high speed thermal printing is disclosed. A microprocessor modifies the font by shortening the vertical component of each symbol to account for the retained heat of the individual print elements. This font modification eliminates the vertical tails that are a common problem when using thermal technology. A method of high speed printing is also disclosed consisting of redefining the set of symbols to be printed by subtracting part of the vertical element in the print instruction, selectively printing the symbols, moving the paper, and printing another row of information. This process is repeated until all of the information is printed on the paper.

5 Claims, 4 Drawing Sheets

HIGH SPEED PRINT QUALITY FONT MODIFICATION

TECHNICAL FIELD

The present invention relates to thermal printers, and in particular to font sets used in thermal dot-matrix printers using thermo-sensitive paper or thermal transfer dot-matrix printers.

BACKGROUND INFORMATION

Various kinds of dot printers are known in the art. Early so-called "dot matrix" printers employed one or more pins driven forward and backward by a solenoid drive mechanism to transfer ink from a ribbon to the surface of a media as a series of dots or "pixels". This type of printer can be contrasted to laser printers, electrostatic printers, and the like, which form an entire two dimensional area as dots from a "toner" material which is then transferred to the surface of the media and fused to the surface by the application of heat. While mechanical dot matrix printers are still used in some applications, modern dot printers are more likely to employ a thermal inline printhead, a thermal printhead or an inkjet printhead.

Typically, a thermal printhead includes a plurality of print positions arranged in either or vertical or horizontal line. Each print position has a heating element connected to wires. When power is applied to the wires, the heating element increases in temperature. At a certain temperature, the heating element causes a visible dot to appear on the media being printed when employing thermal direct techniques where the heat is applied to a heat-sensitive coating on the surface of the media, or, where ink is transferred from a thermally sensitive ribbon to form a dot on the surface of the media.

The size and shape of the dot is a function of the shape of the heating element, power level, temperature of the heating element and the length of time the element is applied to the medium or ribbon. As the heating elements retain heat from previous printing operations and adjacent elements, the temperature of the heating elements rise. Thus, given a constant power level and velocity across a print medium, the size of the dots expands due to retained heat in the print heating element.

When using a conventional thermal printer, the heating elements are selectively heated to form a character as the thermal printing head travels in the printing direction at a predetermined pitch. As such, one character is formed by the dots for each character each time the thermal printing head is traveled by a predetermined number of dots. Once an entire row of characters is printed, the paper advances so that another row of information can be printed as the process is repeated. As speed of paper advancement increases, the amount of time available for the printhead to heat up and cool down decreases. The surfaces of these heating elements are heated up too much because of the retained heat from previous printing operations. This retained heat causes the printed characters to have variable density and sometimes characters have a horizontal trailing edge.

As electronically controlled printers continue to develop, in-line thermal printer heads have become popular. An in-line thermal printer head is a stationary head that uses a series of dot printing elements configured in a horizontal line across the width of the paper. As such, the head remains stationary with respect to the paper. The number of dot printing elements is a function of the print quality and the width of the paper. As opposed to a dot matrix printer, which prints a single character then moves a predetermined amount before printing another character, an in-line printhead selectively prints a horizontal row of dots across the paper at once. After a row of dots is printed, a drive system comprising a stepper motor and a system of gears and rollers, moves the media a predetermined distance along a paper path such that another row of dots can be printed. This process is repeated until the entire row of characters is printed on the media. Once the row of characters is printed, the paper is advanced so that another row of information can be printed as the process is repeated. As speed of paper advancement increases, the amount of time available for the printhead to heat up and cool down decreases. The surfaces of these heating elements are heated up too much because of the retained heat from previous printing operations. In an in-line printer, this retained heat causes the vertical elements of the printed characters to have vertical tails. For example, at slow printer speeds, the characters "J", "P", "I", "c", and "g" are printed according to a font as shown in FIG. 4. However, as these characters are printed at faster speeds, the result is illustrated in FIG. 5. The resulting characters have a remarkably lower character quality at higher print speeds.

Previous solutions have addressed this problem by building controllers and sensors into the printheads. These controllers control the pulsewidth of the printhead based on a combination of the temperature of the head measured by a sensor, the number of previous dots, and the number of adjacent dots printed. The pulsewidth is the amount of energy delivered to a print element. Thus, when the print element is already "hot," the pulsewidth can be reduced. This reduction in pulsewidth results in more uniform heating of the printheads and greater character quality. However, this solution requires the addition of controllers and sensors, resulting in higher printhead costs. Additionally, the printhead is physically larger necessitating larger and more expensive printhead support structure.

Past solutions have also included the use of a thermal print element history algorithm in the printer microcode. Such a solution also controls the pulsewidth by reducing the pulsewidth based on the previous history of the print element used in the printing process and the history of adjacent print elements. This solution requires extra processing time by the printer microprocessor resulting in higher CPU costs. Additionally, this solution requires significant time to initially develop and test the microcode.

What is needed, therefore, is a device or a method which economically and simply accounts for the distortion of characters due to the insufficient heating and cooling of the vertical printhead elements.

SUMMARY OF THE INVENTION

The previously mentioned needs are addressed with the present invention. Accordingly, there is provided, in a first form, a thermal printer composed of an inline thermal printhead for printing symbols or characters on a media surface as a series of dots, a drive system for moving the paper across the printhead and print logic for outputting character print signals to the printhead such that the vertical elements of the characters are shortened. Additionally, a method of high speed printing is also disclosed consisting of redefining the symbols or set of characters to be printed by subtracting at least one dot from each series of vertical dots, selectively printing a horizontal row of dots, moving the paper, and selectively printing another row of dots until the entire row of information is printed. This process is repeated until all of the information is printed on the paper.

Modifying the font or character instructions by shortening the vertical elements of each character to be printed compensates for the retained heat problem typically encountered in this type of printing. Each vertical element in a character can be shortened a different amount based on the length of the vertical element. As such, this font modification eliminates the need for additional heat sensors or software routines previously used to solve this problem. These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–7 of the drawings, in which like numbers designate like parts. In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

Figure 1:
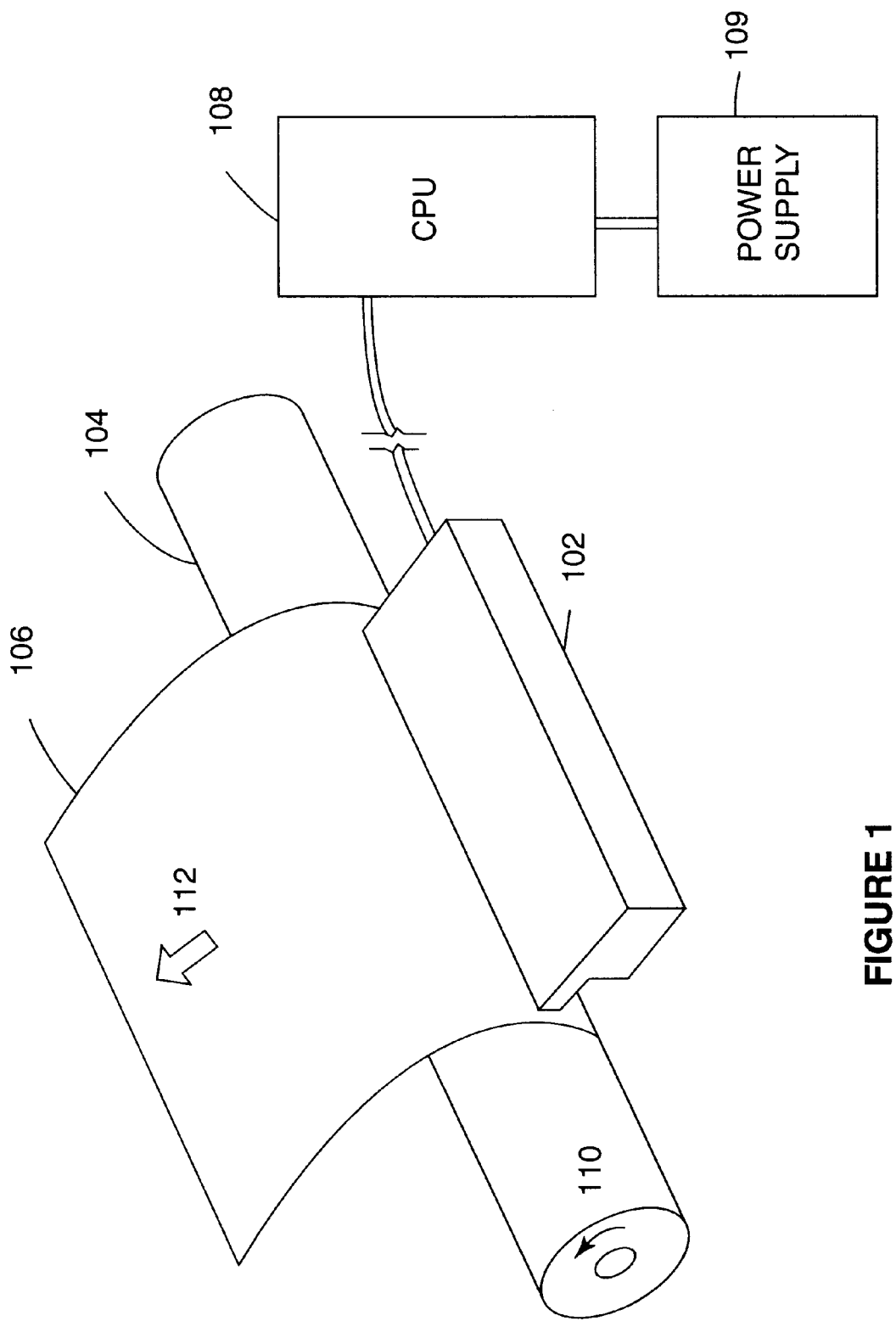
FIG. 1 a schematic view of a thermal recording apparatus in which an embodiment of the invention is applicable.

In FIG. 1, an in-line thermal printhead 102 is mounted in such a manner that it can be lowered against a platen roller 104. Thermal printhead 102 consists of a horizontal linear array of numerous heating elements (not shown). The heat generating elements individually generate heat by power supplied by electric power supply 109 and are activated by heating signals from a central processing unit ("CPU") 108. A thermally sensitive recording medium 106, for example recording paper or a plastic sheet, is supported on platen roller 104. Platen roller 104 is rotated counterclockwise in direction 110, to advance recording medium 106 in succession in a direction 112. A system of gears (not shown) powered by a stepper motor (not shown) rotates platen roller 104.

Figure 2:
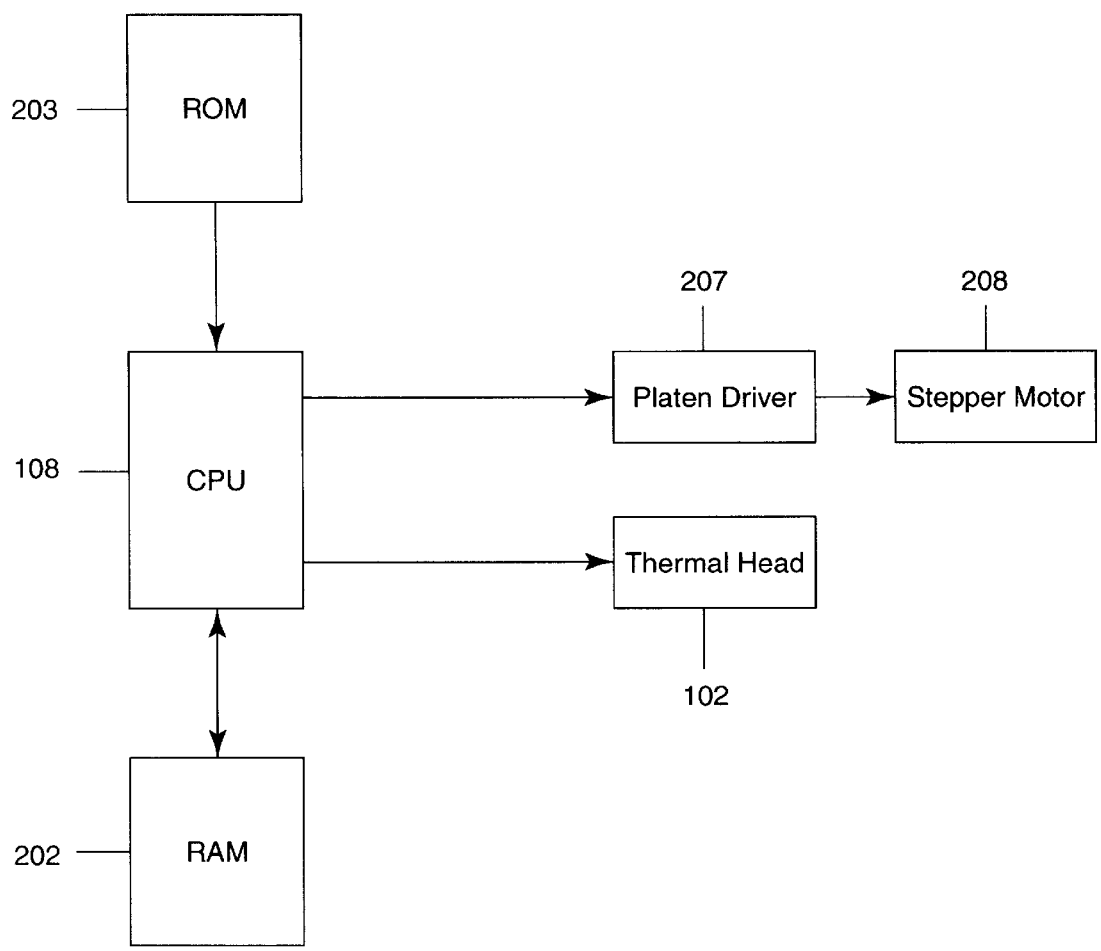
FIG. 2 a flow chart showing the control sequence and print logic for one embodiment of the present invention.

FIG. 2 shows a block diagram for a thermal printer related to one embodiment of the present invention. CPU 108 controls the printer in accordance with a program stored in a read-only memory ("ROM") 203. CPU 108 serves to process data sent to the printer by a keyboard (not shown) or another CPU (not shown). The processed data is temporarily stored in random access memory ("RAM") 202. Then, in response to a printing command entered on a keyboard or another CPU, CPU 108 reads the text data from RAM 202 and executes a character pattern routine stored in ROM 203 to generate the text data. The character pattern contains predetermined row and column dot locations for each character or symbol. As printing starts, CPU 108 continuously outputs each horizontal array of dots of the character patterns to thermal printhead 102. Thermal printhead 102 has dot heating elements so that it may selectively pass current through the dot heating elements corresponding to the horizontal array of data. Each time the horizontal array of dot heating elements finishes its selective heating, CPU 108 sends out a motor-driving pulse to a platen driver 207 so that platen driver 207 can operate a stepper motor 208 one increment at a time, thereby moving platen 104 in relation to thermal printhead 102 (FIG. 1).

The font or character set of symbols provided by this invention provides character images that are adapted to be printed by thermal printhead 102. When thermal printhead 102 prints a row of characters, CPU 108 controls the heat directed to each dot heating element of thermal printhead 102 as recording medium 106 passes by in contact with, or closely adjacent to, thermal printhead 102. The thermal energy of each print element is varied as recording medium 106 moves past according to instructions stored in ROM 203. The predefined character patterns causes vertical elements of the characters to be printed with different microcode instructions or "print logic."

Figure 3:
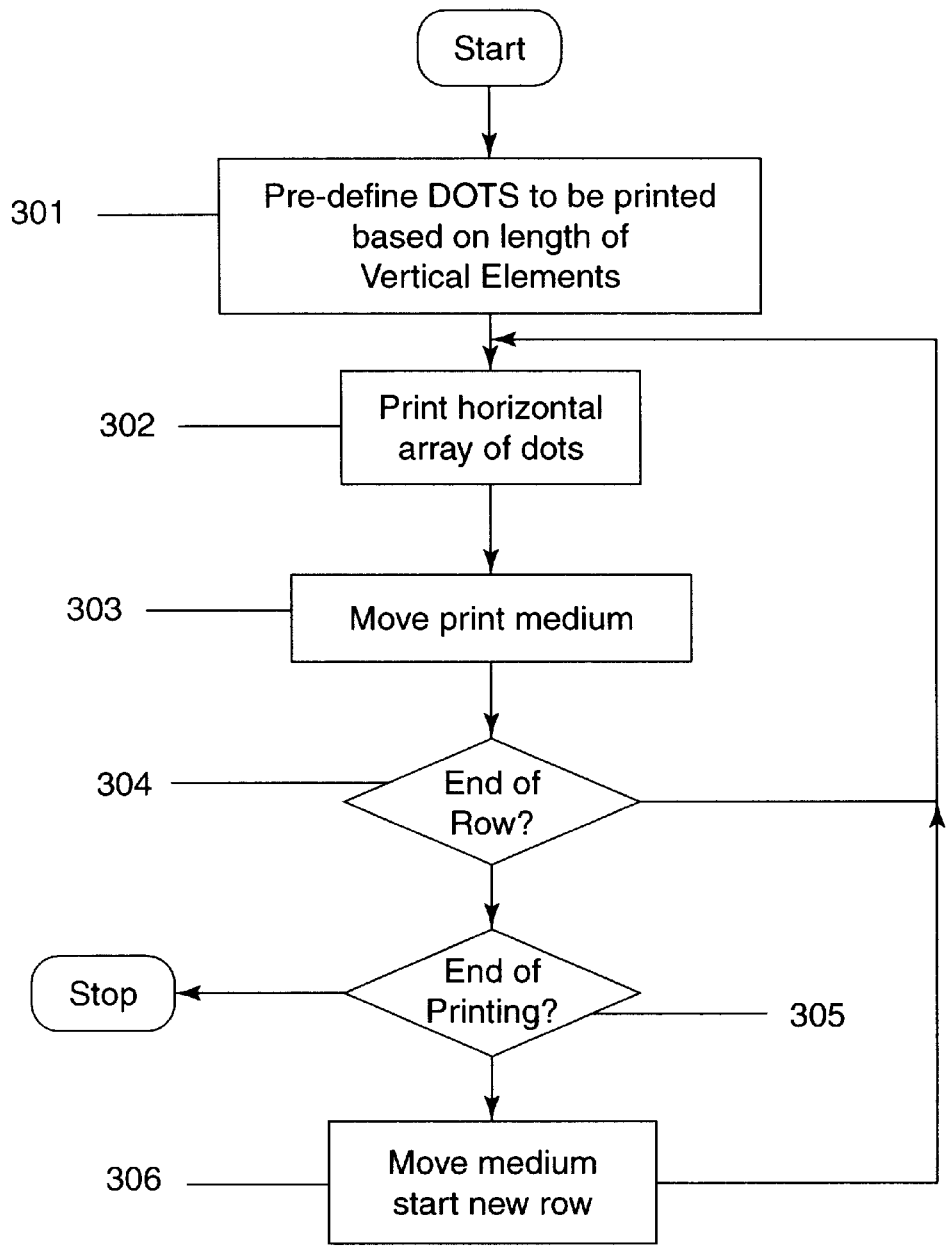
FIG. 3 a block diagram showing a thermal printer according to an embodiment of the present invention.
Figure 4:
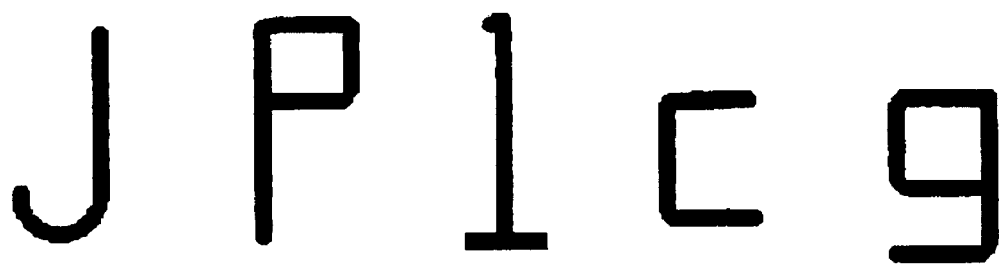
FIG. 4 illustrates five characters, "J", "P", "I", "c", and "g" as printed by related art at low print speeds.
Figure 5:
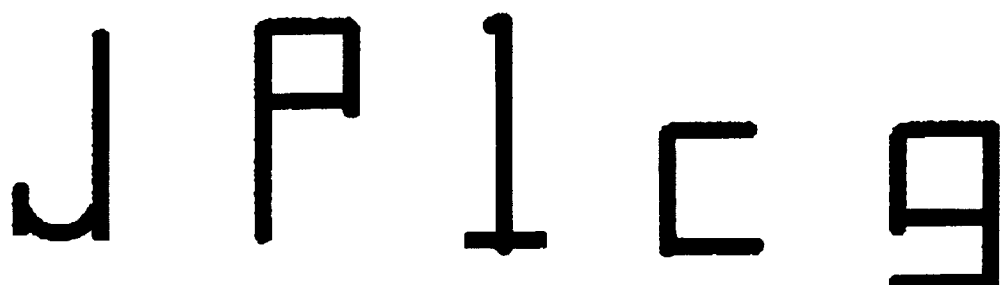
FIG. 5 illustrates five characters, "J", "P", "I", "c", and "g" as printed by related art at high print speeds.

In operation, CPU 108 operates according to the flow shown in FIG. 3. In response to a printing command as a result of data stored in RAM 202 and character patterns stored in ROM 203 (step 301), selected heating elements are powered in thermal printhead 102 to print a first row of data (step 302). Platen roller 104 then moves print medium 106 a predetermined distance (step 303). Steps 302 and 303 are repeated until an entire row of information is printed on print medium 106 (step 304). After the row of information is printed, the medium is moved so that a new row of information can be printed (step 306). This process is repeated until all information is printed (step 305).

Figure 6:
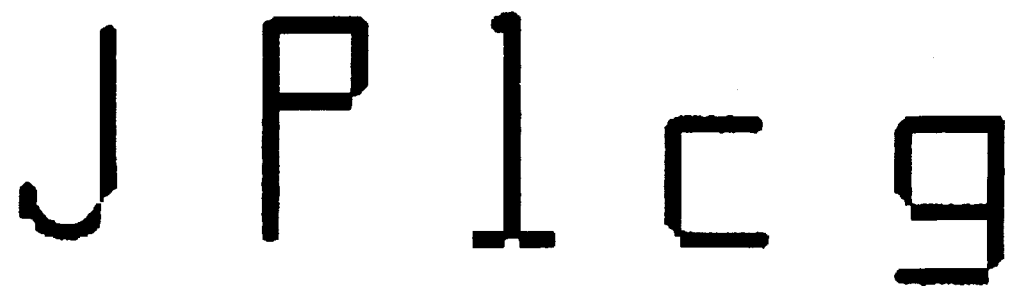
FIG. 6 illustrates five characters "J", "P", "I", "c", and "g" in a font according to the present invention.

As the last horizontal array of dots are printed for each row of information, CPU 108 does not send the normal instruction to print some of the last "dots" forming each vertical row of dots or element of the characters. FIG. 6 illustrates the characters "J", "P", "I", "c", and "g" as the instructions for these characters are sent to thermal printhead 102. The individual characters which compose this set of character patterns or "font" are defined in step 301 (FIG. 3) by a shortening of the vertical elements by one or more dots of each character. Characters "J", "P", "I", "c", and "g" are depicted in FIG. 6. Pre-defining of the "dots" in step 301 is programmed by the manufacturer into a series of instructions or "logic" and stored in ROM 203.

Figure 7:
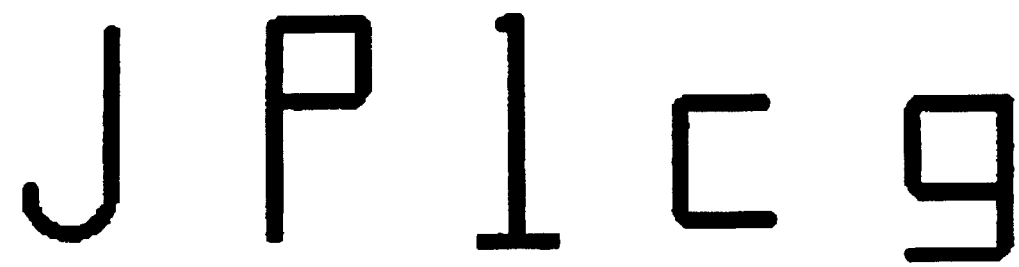
FIG. 7 illustrates five characters "J", "P", "I", "c", and "g" according to the present invention as printed by a thermal printer at high print speeds.

Because the print elements are already "hot" and in contact with recording medium 106, the last portion of the vertical element is printed due to the residual heat of the print element and not due to instructions from CPU 108. FIG. 7 illustrates the resulting, printed characters for "J", "P", "I", "c", and "g." Thus, the resulting characters are free from the vertical trailing edge of the related art. The number of dots not printed vary according to the length of the vertical elements. For instance, the longer vertical element on the right side of the "J" may have the last 2 dots missing where the shorter left side may have only 1 dot missing.

In sum, the present invention has several substantial advantages over the related art. Some of the related art have solved the problem of retained heat in the print elements by using sensors and controllers to control the pulsewidth of the print elements based on the temperature of the head and/or measured by a sensor history of previous printings. However, this solution requires the addition of controllers and sensors, resulting in higher printhead costs. Additionally, the printhead is physically larger necessitating larger and more expensive printhead support structure.

Other solutions have created software routines based on the development of thermal print element history algorithms. This solution requires extra processing time by the printer microprocessor resulting in higher CPU costs. Additionally, this solution requires significant time to initially develop and test the microcode. The font modification disclosed in this invention can be advantageously used to increase the quality of printing characters at high speeds, using conventional in-line thermal printing technology without employing additional hardware or software.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A printer, comprising:

a printhead adaptable for printing a plurality of symbols on a recording medium surface as a series of dots, wherein said printhead is an inline thermal printhead;

a drive system for creating relative movement in a direction of printing movement between said printhead and said recording medium; and a print logic for outputting symbol print signals to said printhead, said symbol print signals comprising a series of dots which are generally parallel to said printing movement and including logic for eliminating at least one dot from an end of selected series of dots, wherein said printer logic further contains logic to cause said printhead to print at least one dot as a result of residual heat of a print element in said printhead even though a symbol print signal was not output from said print logic to print said at least one dot.

2. The printer of claim 1, wherein said print logic further comprises logic which outputs said series of dots which are generally parallel to said printing movement are in a vertical direction in relation to said symbols.

3. The printer of claim 1, wherein said print logic further comprises logic which outputs symbol print signals eliminating a last dot from each of the series of dots which are generally parallel to said printing movement and forming each of the plurality of symbols.

4. A font modification logic system, comprising:

a printer microprocessor logic for outputting symbol print signals to a printhead resulting in a series of vertical dots, and including logic for eliminating at least one dot from an end of selected series of vertical dots, wherein said printhead is an inline thermal printhead, wherein said printer microprocessor logic further contains logic so that said printhead prints the said at least one dot as a result of residual heat of a print element in said printhead even though a symbol print signal was not output from said print logic to print said at least one dot.

5. A method of printing a symbol using a thermal printhead comprising the steps of:

inputting signals defining a series of N dots to be printed on a medium by said thermal printhead;

redefining the series of N dots so that signals sent to said thermal printhead do not instruct said thermal printhead to print the Nth dot in said series of dots on said medium; and printing said series of dots on the print medium by said thermal printhead, whereby said thermal printhead prints said Nth dot in said series of dots as a result of residual heat of a print element in said thermal printhead.

* * * * *